United States Patent [19]

Cournoyer et al.

[11] 4,327,952
[45] May 4, 1982

[54] DOCUMENT STORAGE FILE

[75] Inventors: Bernard T. Cournoyer, Holden; Robert G. Bogren, Worcester; David M. Wright, Shrewsbury, all of Mass.

[73] Assignee: Wright Line Inc., Worcester, Mass.

[21] Appl. No.: 140,968

[22] Filed: Apr. 17, 1980

[51] Int. Cl.³ .................. A47B 63/00; B65D 85/67
[52] U.S. Cl. ..................... 312/184; 312/9; 312/12; 206/387
[58] Field of Search ............. 312/183, 184, 9, 12, 312/13; 206/53, 387; 211/13; D19/90

[56] References Cited

U.S. PATENT DOCUMENTS

| | | | |
|---|---|---|---|
| 1,274,191 | 7/1918 | Nixon et al. | 312/12 |
| 2,223,978 | 12/1940 | Dew | 312/184 |
| 3,495,716 | 2/1970 | Gregory | 206/387 |
| 3,622,012 | 11/1971 | Lundgren | 312/184 |
| 3,696,935 | 10/1972 | Dean | 211/13 |
| 3,921,798 | 11/1975 | Dean et al. | 206/53 |
| 3,939,977 | 2/1976 | Price et al. | 206/53 |
| 3,980,360 | 9/1976 | Wright et al. | 312/184 |
| 4,056,296 | 11/1977 | Hedstrom et al. | 312/184 |
| 4,067,629 | 1/1978 | Amatsu et al. | 206/387 |
| 4,131,197 | 12/1978 | Blankenmeister et al. | 206/387 |

FOREIGN PATENT DOCUMENTS

| | | | |
|---|---|---|---|
| 229265 | 2/1963 | Austria | 312/184 |
| 2311379 | 12/1976 | France | 206/387 |
| 89805 | 12/1958 | Netherlands | 312/184 |
| 359117 | 2/1962 | Switzerland | 312/184 |

*Primary Examiner*—Victor N. Sakran
*Attorney, Agent, or Firm*—Milton E. Gilbert; Gary E. Ross

[57] ABSTRACT

A storage file of open box-like form for storing books, documents, cassettes, discs and the like in a suspension filing system is disclosed herein. In one embodiment the storage file includes on its top a hook and a lock means, designed to prevent inadvertent disengagement of the hook. Another feature is an interlock which cooperates with a strap-like member disposed parallel to a hanger bar in the filing system to prevent rotation of the storage file while it is suspended from the hanger bar.

13 Claims, 8 Drawing Figures

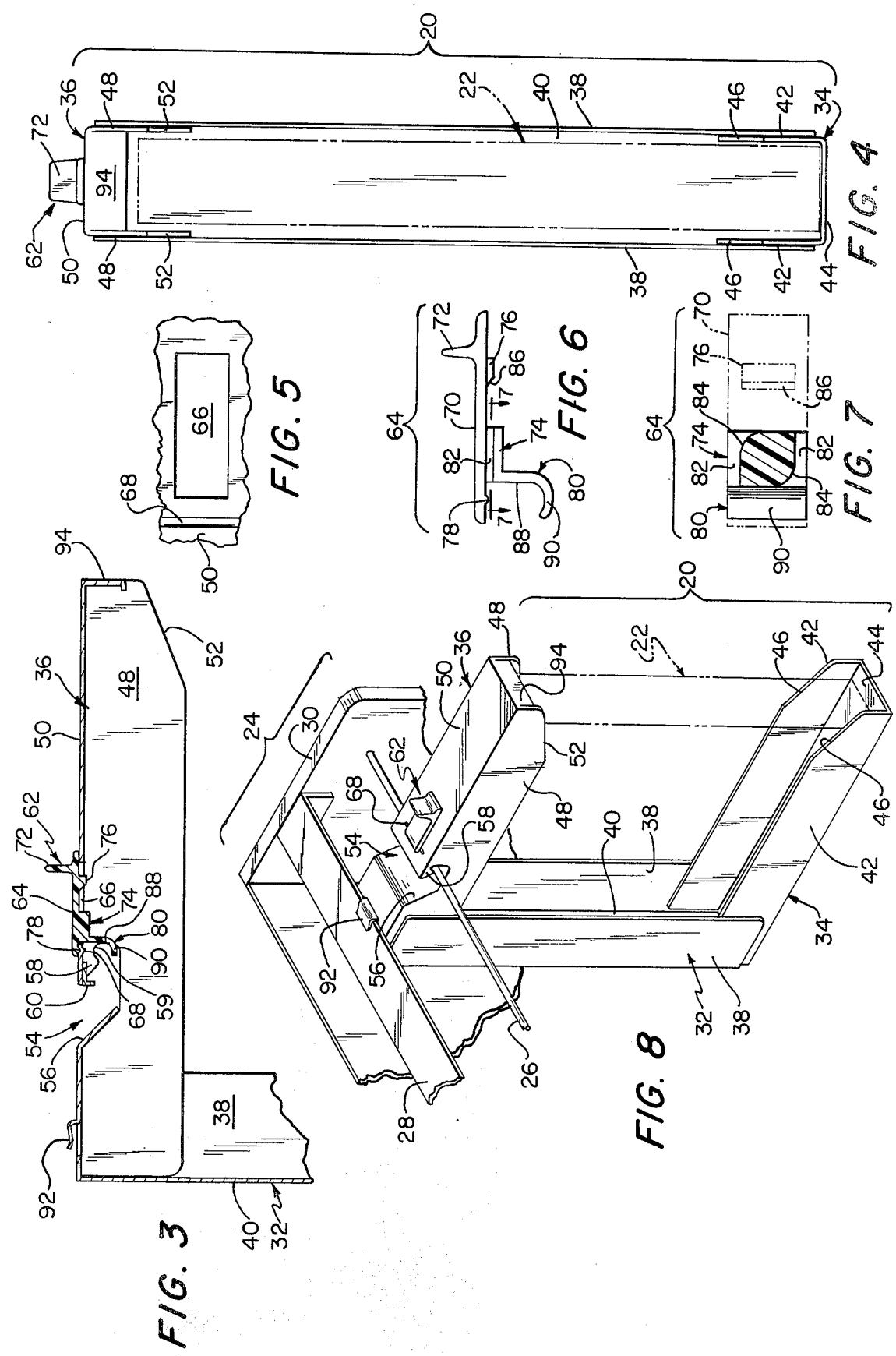

DOCUMENT STORAGE FILE

BACKGROUND OF THE INVENTION

This invention relates to document storage files, and more particularly to such files which are adapted to removably secure a wide variety of types of document to a suspension filing system.

Suspension filing systems are well known. A commonly encountered system of this type is the so-called center hook filing system, which in its simplest form comprises a single horizontal support bar to which appropriate files provided with hooks and designed to accommodate the documents to be filed may be detachably secured. Such filing systems have found wide use, particularly in the filing of large format items, such as computer printouts, flow diagrams, program listings, and the like, and a wide variety of storage files have been devised to accommodate different materials to such suspension filing. Thus, for instance, stationary materials may be secured by a modified post binder which incorporates in its spine a centered or eccentrically mounted hook, as disclosed in U.S. Pat. Nos. 3,865,445, 3,980,360 and 4,056,296. Alternatively, modified conventional file folders incorporating into their covers a pair of such hooks may be used to loosely assemble stationary or other sheet-form items for center hook suspension filing.

The document storage files just mentioned are intended for the filing of documents which have a sheet-like nature, be they individual pages, accordian-folded printouts, or thin prebound items. Notably, they do not readily accommodate larger bound items, such as books. Further, in the broadest sense, a document is a recorded assemblage of data, and need not take any of these forms. Thus, in computer facilites, data is commonly stored on tape or magnetic disks. While suspension filing may be provided for reels of tape by a tape reel storage band which incorporates a hook, as in U.S. Pat. No. 3,696,935, the storage of books, cassettes, disks, and other such media is typically on flat shelves. Thus, not all types of document may be easily accommodated to suspension storage with prior art files, and mixed media libraries heretofore have often employed both suspension filing systems and regular shelving, with a resultant loss in user convenience since related documents on different media perforce have had to be stored remotely from one another.

Prior art storage files suffer from a number of other disadvantages. Thus, removal of a document from a suspension filing system has generally required the removal of the file from the suspension bar. As adjacent document files may readily overflow into the void previously occupied by the removed file, return of the file has been time consuming, misfiling has been more likely, and missing files have not been readily apparent. A further disadvantage is that center-hook suspension files for bound documents generally attach to the spine of the document and attach the document to the suspension filing system in a spine-up position, obscuring any title on the spine of the document and thus requiring additional, and possibly less convenient, labeling.

OBJECTS OF THE INVENTION

Accordingly, it is an object of the present invention to provide a document storage file for use with center hook suspension filing systems which can accommodate a wide variety of types of documents.

It is a further object of the present invention to provide a document file for suspension filing books, record and cassette albums, and similar media in center-hook type systems.

Another object of the present invention is to provide such a document file which allows access to its contents without the necessity of removing the file from the suspension filing unit, thereby improving access, and reversing space in a library of stored items for items removed, thereby facilitating return of documents and making more apparent missing items.

Yet another object of the present invention is to provide a center-hook suspension file which stores bound documents with their spines vertical so as to permit users to view and access such documents in the same way as does ordinary library shelving.

SUMMARY OF THE INVENTION

These and other objects are met in the present invention of a storage file of open rectangular box-like form for use with a suspension file system of the type adapted to suspend items by a single hook. The file has an open front, through which access may be gained to its interior, and partially open sides, as an aid to inserting and removing documents. The remaining sides of the file are closed, and the top of the file is provided with a hook adapted to the suspension system.

The file provides, in effect, an individual book shelf, with book ends and back, capable of being suspended in a suspension file system, and clearly may be dimensioned to accommodate any item which may be stored on a flat shelf. As the file may be dimensioned to accommodate single documents, such documents may be readily intermixed with other media conventionally stored in suspension filing systems. Access to the contents of the file may be gained through the open front of the box without the necessity of removing the file from its suspending hanger. Such files dimensioned to accommodate single documents may be left in place in the library when a document is removed, thus facilitating the proper return of the document as well as making readily apparent the absence of a document.

BRIEF DESCRIPTION OF THE DRAWINGS

Other features and many of the advantages of the invention are set forth in or rendered obvious by the following detailed description and the accompanying drawings wherein:

FIG. 3 is a fragmentary sectional view of the storage file, taken along the line 3—3 of FIG. 2;

FIG. 4 is a front view of the storage file of FIG. 1;

FIG. 5 is a top view, on an enlarged scale, of a portion of the storage file of FIG. 1, disassembled to show an aperture forming a portion of the lock mechanism for securing the file to a suspension file unit;

FIG. 6 is an enlarged side view of the lock bolt for use with the aperture of FIG. 5;

FIG. 7 is a sectional view of the lock bolt of FIG. 6, taken along the line 7—7 of FIG. 6; and FIG. 8 is a fragmentary perspective view of the front of the storage file of FIG. 1 attached to a suitable suspension file unit.

In all of the views, like numbers refer to like parts.

DETAILED DESCRIPTION

Figure 1:
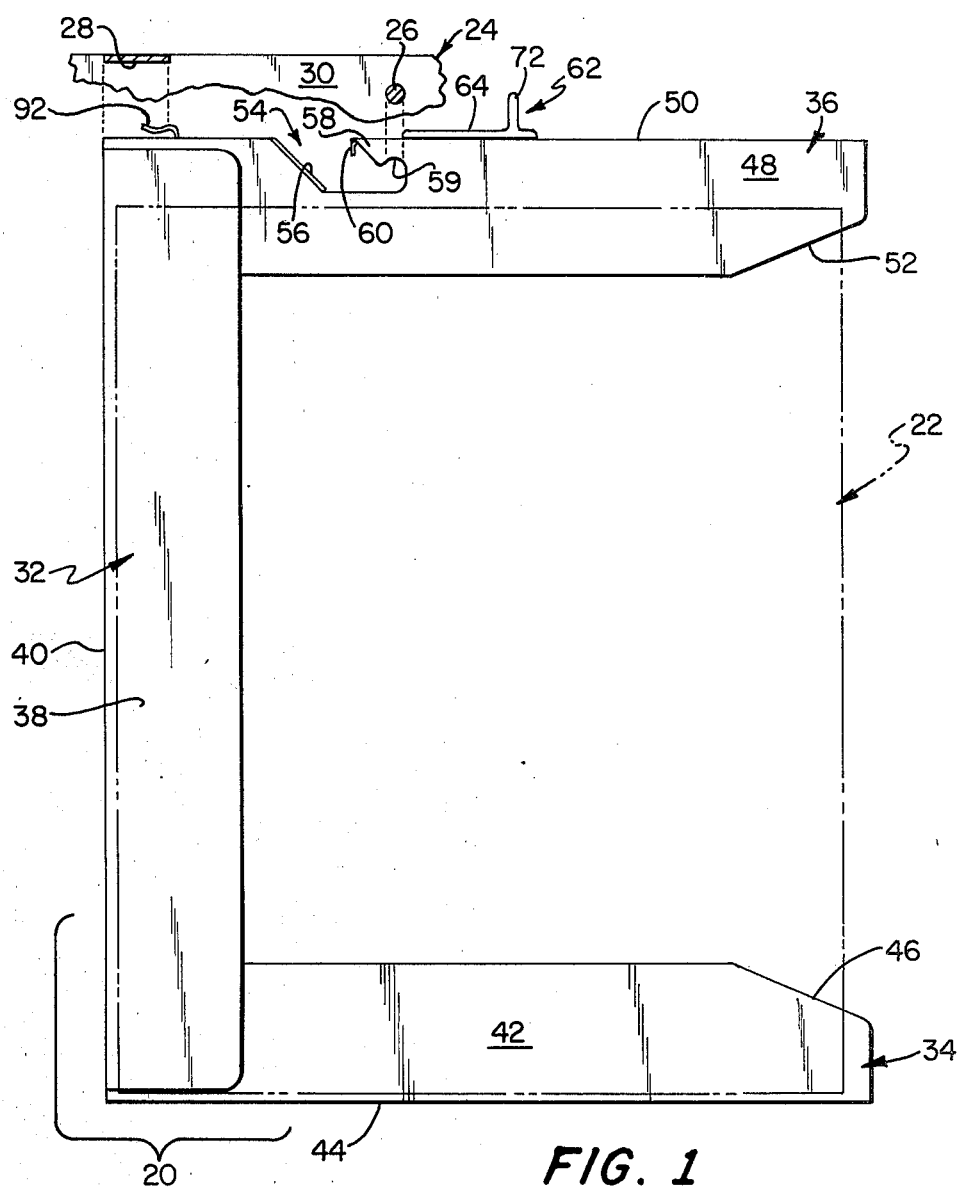
FIG. 1 is a side view of a storage file which constitutes a preferred form of the invention and a fragmentary sectional view of a detached suspension file unit of the type with which the invention is intended to be used.

Referring to FIGS. 1 and 8, there may be seen a storage file 20 made in accordance with the principles of the present invention supporting a document 22 (shown in phantom). By way of example, document 22 may be a book, a loose-leaf binder, a magnetic tape cassette, or one or more phonograph records, magnetic recording discs, stiff sheetlike printed or typewritten records, or other like or similar article. Storage file 20 is intended for use with a suspension file unit 24, only partially illustrated for clarity, and is shown disengaged and engaged to such a unit in FIGS. 1 and 8 respectively. Suspension file unit 24 may be any of a number of units adapted for center hook suspension of appropriately secured tape reels and stationary items, and is typified by having a horizontal suspension bar 26 and a vertically and horizontally spaced apart parallel strap 28, the ends of which are affixed to and supported by a frame 30 (only part of which is shown). Those familiar with such suspension file units will appreciate the function of bar 26 to be to support an item to be filed by means of an appropriate hook on the item, and the function of strap 28 to be to limit the rotation about bar 26 of an item so secured. It will be further appreciated that bar 26 and strap 28 may be either fixedly or adjustably affixed to frame 30, and further, may be in the form of a bar and a strap, as illustrated herein, a pair of bars, as shown for example in U.S. Design Pat. No. 246,593, or parts of a unitary shelf, such as in the suspension file unit shown in U.S. Pat. No. 3,980,360.

Storage file 20 is in the general form of an open, hollow rectangular box diminsioned to accept document 22. As will be described in greater detail hereinafter, portions of the rectangular faces delimiting this form may be deliberately omitted from the structure. In a preferred embodiment, best seen in FIG. 8, storage file 20 comprises an interlocking frame of channel-shaped sections including a back section 32 securing in cantilever fashion a bottom section 24 and a top section 36 distal from one another in parallel opposing relationship, with the channel formed by each section directed toward the interior of the C-shaped structure thus formed. It will be appreciated that in this form the body of storage file 20 may be fabricated from a single piece of thin sheet material such as sheet metal, appropriately cut and folded. Alternatively, the body of storage file 20 may be cast or molded from, for instance, an appropriate polymeric material, or fabricated by fastening together, as by welding, individual panels or extruded sections.

In greater detail, each of the channel-shaped sections just enumerated includes three thin substantially planar walls of generally rectangular outline, two of which are of similar size and shape and are supported, each by a single edge, in spaced-apart parallel opposing relationship to each other by the correspondingly sized edges of the third wall included between and normal to them. In a preferred embodiment, these three walls are formed from a single sheet of material, appropriately bent.

To consider the individual sections, back section 32 comprises a pair of rear side walls 38 and an included back wall 40. The thicknesses of side and back walls 38 and 40 respectively are similar (as are those of the other walls of the preferred embodiment) and are selected on the basis of the strength and formability of the material of construction. In the illustrated embodiment, the width of back wall 40 is set so that the distance separating rear side walls 38 is sufficient to accommodate the width of the document 22 to be filed plus the two side walls 42 (or 48). The opposite ends of rear side walls 38 terminate short of the ends of rear wall 40. The principal function of rear side walls 38 is to rigidly secure the cantilevered structure of bottom section 34 and top section 36.

Bottom section 34 is similarly formed of lower side walls 42 and bottom wall 44. The width of bottom wall 44 (i.e., the distance separating lower side walls 42) is only slightly in excess of the width of document 22, in order that bottom section 34 might fit within back section 32, with bottom wall 44 normal to and abutting with back wall 40 and with lower side walls 42 between and in parallel contact with rear side walls 38. The remaining dimension (the length) of bottom wall 44 is chosen to be slightly in excess of the depth of document 22, as are the corresponding dimensions of lower side walls 42. Lower side walls 42 are positioned on bottom wall 44 such that the edges of all three walls normal to their common edges are substantially conterminous. The remaining dimension of each lower side wall 42 is selected inter alia on the basis of the strength of the material of construction, it being one of the functions of the lower side walls to strengthen the cantilever structure of bottom section 34. In a preferred embodiment, the connection between back wall 40 and bottom wall 44 is the hinge formed by folding a single flat sheet of which both are a part. The junction is strengthened by spot welding or otherwise fastening rear side walls 38 to the corresponding lower side walls 42. The portion of each lower side wall 42 distal from both back section 32 and bottom wall 44 may be relieved, as by inclined edges 46, or be rounded, as an aid in inserting document 22, as will be described hereinafter.

Top section 36 comprises upper side walls 48 and top wall 50. Except as hereinafter described, top section 36, upper side walls 48, and top wall 50 are similar to bottom section 34, lower side walls 42, and bottom wall 44, respectively, top section 36 being affixed to back section 32 as is bottom section 34, but in opposing relation thereto, and upper side walls 48 being provided with inclined edges 52 similar to inclined edges 46.

Figure 2:
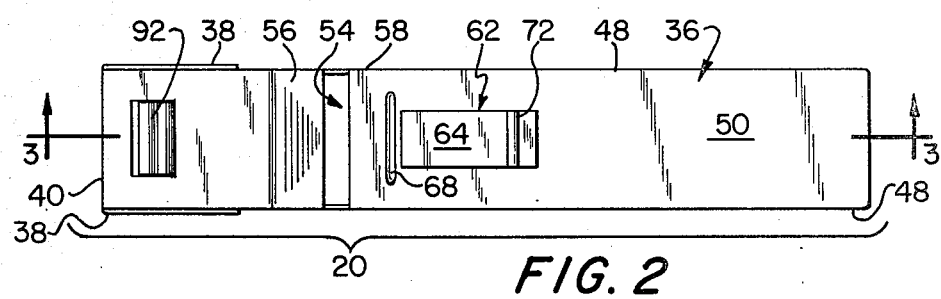
FIG. 2 is a top view of the storage file of FIG. 1.

The principal difference between top section 36 and bottom section 34 is the presence in the former of a hook, identified generally by numeral 54, which may best be seen in plan and section in FIGS. 2 and 3, respectively. Hook 54 is formed by relieving portions of upper side and top walls 48 and 50, respectively, and comprises an inclined wall 56, a hooked tab 58, and a reinforcing piece 60. Inclined wall 56 extends between and at substantially right angles to upper side walls 48, and makes an angle, preferably 45° as shown, to top wall 50. Inclined wall 56 joins top wall 50 along a line displaced toward back section 32 from the center of the top wall, and extends away from top wall 50 the further the inclined wall becomes from the back section. In a preferred embodiment, inclined wall 56 is formed by making a cut across the width of wall 50, removing a section of upper side walls 48 between this cut and back section 32, and bending the resulting free standing portion of top wall 50 downward and backward toward bottom section 34 and back section 32 respectively. Alternatively, a separate inclined wall may be secured, as by welding, between upper side walls 48, and a portion of top wall 50 adjacent the inclined wall removed. The removed portion of top wall 50 in any event is arranged to extend across the width of the top wall and from the junction of the top wall with inclined wall 56 away from rear section 32 a distance in excess of (and preferably several times) the diameter of suspension bar 26.

Hooked tab 58 consists of a portion of top wall 50 and identically contoured portions of side walls 48. Tab 58 is formed by cutting away a portion of each upper side wall 48 between inclined wall 56 and the end of top section 36 distal from back section 32. As seen in FIG. 1, these cuts follow the contour of inclined wall 56 to its end distal from top wall 50, then parallel top wall 50 by a distance substantially equal to the corresponding dimension of the removed section of top wall. It will be appreciated that the cuts at this point extend beneath top wall 50 to the same extent as the projection of the inclined wall 56 on the plane of the top wall. The cuts then proceed directly toward top wall 50 a distance slightly in excess of the diameter of suspension bar 26, then follow semi-circular paths 59 the convex sides of which are directed toward top wall 50 and the diameter of which substantially match that of the suspension bar, and finally parallel inclined wall 56 to intersect top wall 50. In the preferred embodiment, the height of top section 36 between that part of semicircular portion 59 of hook 54 closest to upper wall 50 and the exterior surface of top wall 50 is chosen to be on the order of the vertical separation between suspension bar 26 and strap 28. It will be understood that the extent of inclined wall 56 must be sufficient to allow this relief of upper side walls 48, and in any event the extent of hooked tab 58 must have sufficient structure to afford support of a fully loaded storage file 20. Similarly, it will be appreciated that the height (i.e., the dimension normal to top wall 50) of upper side walls 48 must be sufficient to accommodate the cuts forming hook 54 and still insure sufficient mechanical strength to the cantilevered structure of top section 36.

Hooked tab 58 is provided with a reinforcing piece 60, which in a preferred embodiment is a strap having an L-shaped cross-section, one flat portion of which is affixed to the interior surface of top wall 50 between upper side walls 48 such that the other flat portion is parallel to back wall 40 and is aligned with the portion of the hooked tab nearest the back wall, extending from the top wall toward bottom section 34. Alternatively, reinforcing piece 60 may be formed by appropriately turning a portion of top wall 50. It will be understood the reinforcing piece 60 must be arranged so as to not prevent passage of suspension bar 26 into or out of engagement with hook 54.

Top section 36 is provided with a lock means 62 comprising a bolt 64, an aperture 66 and a detent 68, are shown assembled in FIG. 3 and in individual detail in FIGS. 5-7.

Bolt 64 is preferably molded of a resiliently distortable material, such as nylon, polypropylene, phenolic or a similar polymer, and comprises a top plate 70, a thumb tab 72, a guide 74, front and back locating pins 76 and 78 respectively, and latch 80. In this case the top plate 70 is a substantially flat, smooth plate of rectangular plan and is dimensioned so as to have a width less than the width of top wall 50, and a thickness chosen so that the top plate is reasonably rigid but may be resiliently deformed as necessary for assembly as will be described hereinafter. Thumb tab 72 is a substantially flat plate dimensioned so as to be easily grasped between a thumb and a finger and is disposed on top plate 70 so as to extend normally to both the surface and the long axis of the top plate. In a preferred embodiment thumb tab 72 is disposed near one end (refered to hereinafter as the "front end") of top plate 70 so as to be more easily accessible.

Disposed on the other surface of top plate 70 is guide 74. Guide 74 is in the form of a rectangular solid disposed in parallel alignment with top plate 70 and with its length extending across the width of the top plate. Guide 74 is situated near the end (hereinafter refered to as the "back end") of top plate 70 remote from the front end so as to clear the back end by a distance slightly in excess of the diameter of suspension bar 26. The guide has a thickness (the dimension normal to top plate 70) about the order of the thickness of the top plate plus the thickness of top wall 50. The remaining dimension (the width) of guide 74 is selected to be less than the width of top plate 70 by an amount depending on the strength of the material of construction of bolt 64 as will be described hereinafter. A pair of grooves 82 are formed in the sides of guide 74 adjacent the lower surface of top plate 70. Grooves 82 extend parallel to the long edges of the top plate and are formed by undercutting the guide 74 equally on both sides to make a substantially square section; the height of this cut is made to be slightly greater than the thickness of top wall 50. The undercut is extended at a pair of diagonally opposite corners of guide 74 to produce quarter round corners 84 in grooves 82, the corners having a radius equal to half the width of guide 74.

Front locating pin 76 is of rectangular plan, with a length (the vertical dimension in FIG. 7) equal to the width of guide 74. The long edge of front locating pin 76 is disposed parallel to the front edges of top plate 70 and the short edges of the pin are equally spaced from the long edges of the top plate. Front locating pin 76 has a height (i.e. the dimension normal to the surface of top plate 70) on the order of the thickness of top wall 50. The front locating pin is spaced apart from guide 74 a distance sufficient to allow top plate 70 to be resiliently distorted between the pin and the guide in a direction normal to its plane by a distance in excess of the height of the front locating pin. As an aid in achieving the clearance necessary for assembly of lock means 62, to be described hereinafter, the width of the front locating pin is made as small as possible, consistent with strength, and the long edge of front locating pin 76 nearest guide 74 is provided with a beveled surface 86 providing the pin with a taper in height directed toward the guide.

Back locating pin 78 is a narrow strip of half-round cross-section extending across top plate 70 and parallel to the short dimension of the top plate. Back locating pin 78 is spaced from guide 74 toward the back edge of the top plate by a distance on the order of the radius of suspension bar 26. The diameter of the half-round section of the back locating pin is chosen to be on the order of the thickness of top wall 50 of top section 38.

Latch 80 of bolt 64 comprises sections 88 and 90. Section 88 is in the form of a flat plate of rectangular outline disposed normal to the surface and parallel to the short dimension of top plate 70. Section 88 is affixed to the edge of guide 74 distal from both top plate 70 and front locating pin 76 so as to form a smooth surface with the face of guide 74 nearest the back edge of the top plate. Section 88 is dimensioned to extend the length of guide 74 and has a thickness on the order of that of top plate 70. Latch section 90 is conterminous with and tangent to section 88 and has the form of a right circular cylindrical wall segment. The axis of the cylinder defining section 90 is disposed so as to be parallel to the short dimension of top plate 70 and is disposed on the same side of section 88 as is the back edge of top plate 70. This axis is positioned as far from top plate 70 as the axis of curvature of circular cuts 59 in upper side walls 48 are from the exterior surface of top wall 50 (i.e., in a preferred embodiment by a distance equal to the vertical separation between suspension bar 26 and a strap 28 plus the radius of the suspension bar). The width and wall thickness of section 90 are respectively similar to the width and thickness of top plate 70, and the inside diameter of that section is the same as the diameter of suspension bar 26. The angular extent of the cylindrical segment defining section 90 is chosen to be slightly more (e.g. by 5° or 10°) than 90°, making the lip formed by that section slightly reentrant.

Aperture 66, shown in section and plan in FIGS. 3 and 5 respectively, is a rectangular hole in top wall 50 disposed with its short dimension parallel to the width of the top wall and with its longitudinal axis centered midway between upper side walls 48. The edge of aperture 66 nearest back wall 40 of back section 32 is disposed so as to be as distant from the back wall as the portion of hook 54 most distant from the back wall. The width of aperture 66 is chosen to be slightly larger than the width of guide 74 and its length is chosen to be slightly more than the distance separating front locating pin 76 and back locating pin 78 of bolt 64.

Detent 68 is a shallow linear concavo-convex rib formed in and extending across top wall 50, providing a depression in the outer surface of the top wall and a ridge on the interior surface. Detent 68 is parallel to back wall 40 and displaced toward it from aperture 66 by a distance on the order of the radius of suspension bar 26. The depth of detent 68 is chosen to be on the order of half the thickness of top wall 50, and its length, somewhat less than the width of the top wall, the ends of the detent being substantially equidistant from respective upper side walls 48. Aside from its function in lock means 62, to be described hereinafter, detent 68 also functions as a reinforcing rib for hooked tab 58.

Top wall 50 is also provided with an anchor tab 92 situated between hook 54 and back wall 40. As may be seen with reference to the plan and sectional views shown in FIGS. 2 and 3 respectively, anchor tab 92 in a thin-walled bent tab of generally rectangular plan and of inverted L-shaped section, being centered between side walls 48 and joined to top wall 50 along a line parallel to back wall 40. Tab 92 extends normal to top wall 50 in the direction away from bottom section 34, and then extends parallel to the top wall toward back wall 40. The thickness of anchor tab 92 is substantially the same as that of top wall 50. In a preferred embodiment, anchor tab 92 is formed by making a U-shaped cut in top wall 50 and swaging out the tab. Anchor tab 92 is spaced from detent 68 by a distance slightly less than the horizontal distance separating suspension bar 26 and strap 28 plus the difference between the radius of the suspension bar and the thickness of top wall 50. The separation between top wall 50 and the parallel cantilever portion of anchor tab 92 is chosen substantially equal to the thickness of strap 28. In the preferred embodiment, the material of construction of storage file 20 and the thickness of anchor tab 92 are such that the tab is resiliently distortable, and the portion of anchor tab 92 parallel to top wall 50 is formed with a curved surface, convex toward the top wall and with an axis parallel to backwall 38 and the top wall 50, so as to lessen the clearance between anchor tab 92 and top wall 50 to just less than the vertical thickness of strap 28.

The final structural difference between top section 36 and bottom section 34 is that the top is provided with an index tab 94 at its front end, as illustrated in FIGS. 3 and 4. Index tab 94 is in the form of a thin rectangular wall section, and is disposed between and normal to upper side walls 48 and normal to top wall 50. The long dimension of index tab 94 may but need not be the same as the width of top wall 50. Tab 94 extends down from top wall 50 a distance no greater than that by which inclined wall 56 does. In a preferred embodiment, index tab 94 is cold formed from an extension of top wall 50.

Lock means 62 is assembled by inserting latch section 90 and guide 74 through aperture 66 with bolt 64 disposed such that top plate 70 is in parallel contact with the exterior surface of top wall 50 with the long dimension of the top plate parallel to the width of the top wall and the quarter round corner 84 in groove 82 of the guide nearest the front end of the top plate nearest hook 54. Rotation of bolt 64 by a quarter turn about an axis normal to top wall 50 will then bring latch 80 adjacent hook 54, grooves 82 engaging the long edges of aperture 66. As the rotation proceeds, front locating pin 76 contacts top wall 50 and resiliently distorts top plate 20, the pin riding up and over the top wall. This resilient distortion of top plate 70 during assembly is aided by bevelled surface 86. It will be understood the dimensions of guide 74 must be chosen, on the basis of the material of construction, to permit the guide to sustain the forces acting on it, through grooves 82, while top plate 70 is distorted. As grooves 82 become engaged to the long edges of aperture 66, bolt 64 becomes captively engaged to top wall 50. It will be appreciated that the disposition of the quarter round corners 84 permit only a 90° rotation, at the end of which top plate 70 is aligned with its long dimension parallel the long dimension of aperture 66. In this disposition of bolt 64, front locating pin 76 can fully enter the aperture and be held there by elastic restoring forces, the locating pin thereby preventing inadvertant rotation and consequent accidental removal of bolt 64.

Once assembled, bolt 64, while captive to top wall 50, is free to slide toward and away from back wall 40, limited in the first direction by contact of guide 74 with the edge of aperture 66 nearest the back wall, and in the other direction by contact of front locating pin 76 with the edge of the aperture distal from the back wall. The disposition of the components of bolt 64 and hook 54 are such that this motion alternatively brings latch 80 into hook 54 opposite hooked tab 58 and clear of hook 54. Throughout the linear travel of bolt 64, the lower sides of grooves 86 are held in tension against the interior surface of top wall 50 by the slight elastic distortion of top plate 70 produced by the contact of back locating pin 78 and the top wall.

In use, a document 22 such as a looseleaf notebook is inserted, spine last, into storage file 20 through the front opening opposite back portion 32, the document being positioned between lower and upper side walls 42 and 48 respectively. It will be appreciated that this positioning of the document is somewhat aided by the break in the lower and upper side walls formed by inclined edges 46 and 52 respectively. The document is inserted fully, until it comes to rest in contact with back wall 40, being guided between rear side walls 38 by lower and upper side walls 42 and 48. In this position, document 22 rests on bottom wall 44, being supported in an upright condition by side walls 38, 42 and 48. It will be understood that the height of document 22 which may be so accommodated must be less than the interior height of storage file 20 so that the top edge(s) of the document will clear inclined wall 56 of hook 54 and latch 80 of bolt 64. It will also be appreciated that the document need not be so tall as to extend between upper side walls 48, as rear and lower side walls 38 and 42 are sufficient to provide upright support for the document. The fact that the side walls are only partial provides ready access to documents, which may be most easily removed from storage by grasping them by their front and back.

Storage file 20 may be used on a flat shelf in much the same way as the so-called Princeton file is commonly used in libraries. Its main feature is, however, that it may be used with a suspension filing system, with hook 54 engaging suspension bar 26. The eccentric location of hook 54 results in the storage file being suspended so that its equilibrium position is with top wall 50 not horizontal, but rather inclined with its end nearest back wall 40 elevated. The disposition of hooked tab 58 and top wall 50 is such that when the file is suspended on hanger bar 26 in suspension file unit 24, this out of balance condition results in top wall 50 contacting strap 28, where gravity, under static conditions, will maintain it horizontally. Anchor tab 92 is provided to insure this horizontal positioning of top wall 50, particularly during loading and unloading of documents. As hook 54 of storage file 20 is brought into engagement with suspension bar 26, anchor tab 92 is brought into engagement with strap 28, captivating the strap between the anchor tab and top wall 50. The slightly curved surface of anchor tab 92, together with the resilient nature of the tab, insures a secure fit between strap 28, the anchor tab and the top wall. Anchor tab 92 remains engaged with strap 28 so as to prevent rotation of storage file 20, as long as suspension bar 26 remains captive in hook 54.

Lock means 62 insures against the accidental disengagement of storage file 20 from suspension file unit 24. It will be appreciated that suspension bar 26 cannot be fully inserted into hook 54 unless bolt 64 has been moved clear of the hook, i.e. the bolt is positioned with front locating pin 64 contacting the edge of aperture 66 furthest from back wall 40. The more act of positioning storage file 20 on suspension bar 26 may be used to perform this positioning of the bolt to open position, latch section 90 of latch 80 contacting and being moved forward by the suspension bar as the storage file is positioned so as to locate the suspension bar under hooked tab 58. When suspension bar 26 is situated fully within hook 54 with the storage file resting on the bar in the manner shown in FIG. 8, bolt 64 may be forced toward back wall 40 by manipulating thumb tab 72. As the free end of latch section 90 encounters the suspension bar, it is resiliently sprung away from hooked tab 58 so as to open latch 80 enough to allow that free end to ride over the bar. The elastic restoring forces in latch 80 are relaxed as the free end of latch section 90 passes over the center of bar 26. When the bolt 62 reaches the end of its travel, with guide 74 contacting the edge of aperture 66 nearest back wall 40, back locating pin 78 enters detent 68, and thus relaxes some of the elastic forces on top plate 70. The elastic restoring forces produced by the pin 78 cooperate with those of latch section 90 to hold the bolt in the locked position, capturing suspension bar 26 in the semi-circular recesses 59 of hooked tab 58. The bolt may be opened and suspension bar 26 may be released by applying, through thumb tab 72, a force sufficient to distort top plate 70 and latch section 90 so that back locating pin 78 rides out of detent 68 while simultaneously the tip of latch section 90 is spread open enough to clear the suspension bar.

Certain changes may be made in the above described storage file without departing from the scope of the invention. Thus, for instance, side walls 38, 42 and 48 may be a unitary structure bridging between, for instance, bottom wall 44 and either back wall 40 or top wall 48, rather than channel like walls on each of the bottom, back and top walls. Similarly, lock means 62 may be provided with a bolt employing rotational, rather than linear motion, to captivate the suspension bar. Accordingly, it is intended that the description given herein be interpreted in an illustrative and not in a limiting sense.

What is claimed is:

1. A storage file of open box-like form for storing books, loose-leaf binders, bound documents, cassettes, recording discs and the like, said storage file comprising in combination:
   a bottom of substantially planar form;
   a back of substantially planar form connected conterminously with and normal to said bottom;
   a top connected conterminously with and normal to said back distal from said bottom;
   a pair of sides of substantially planar form disposed parallel to one another and normal to said bottom and to said back, said sides being connected so as to bridge between at least two of said bottom, said back and said top; and
   a hook means on said top for attaching said storage file to a hanger bar of a suspension filing unit, said hook means including a hook and lock means for preventing inadvertent disengagement of said hook from said hanger bar.

2. Apparatus according to claim 1 further including means on said top for engaging said filing system so as to prevent rotation of said document storage file about said hanger bar.

3. Apparatus according to claim 1 wherein said lock means is movable relative to said top so as to be movable between a first unlocking position and a second locking position, said lock means being arranged so that when it is in said second position, it will intersect a line drawn between said hook means and a hanger bar supporting said file by said hook means.

4. A storage file according to claim 3 wherein said hook means forms an opening for admitting a hanger bar into supporting engagement with said hook means, and further wherein said lock means comprises a latch adapted to partially embrace said hanger bar when so engaged and also reduce the effective size of said opening so as to prevent disengagement of said hook means from said hanger bar.

5. A storage file according to claim 3 wherein said top has an aperture and said lock means comprises a member slidably disposed in said aperture for movement between said first and second positions.

6. A storage file according to claim 5 wherein said lock means is rotatable in said aperture between first and second limit positions and is arranged so that when it is in said first limit position it is movably locked to said top and when it is in said second limit position it is free to be removed from said aperture.

7. A storage file according to claim 6 further including means on said top for engaging said filing system so as to prevent rotation of said document storage file on said hanger bar.

8. A storage file according to claim 1 wherein said sides form channels for receiving a book, loose-leaf binder, cassette recording disc, bound documents or the like.

9. A storage file according to claim 1 wherein said pair of sides bridge said back with said top and bottom.

10. A storage file according to claim 1 comprising a bottom section which includes said bottom and a first pair of side walls, a back section which includes said back and a second pair of side walls, and a top section which includes said top and a third pair of side walls, said pair of sides consisting of said three pairs of side walls.

11. A storage file system comprising a suspension filing unit having a horizontal hanger bar and at least one storage file of open rectangular box-like form for storing books, loose-leaf binders, bound documents, sheetlike records, cassettes and the like, said storage file comprising in combination:
   a bottom of substantially planar form;
   a back of substantially planar form connected conterminously with and normal to said bottom;
   a top connected conterminously with and normal to said back distal from said bottom;
   a pair of sides of substantially planar form disposed parallel to one another and normal to said bottom and to said back, said sides being connected so as to bridge between said bottom and at least one of said back and said top; and
   a hook means on said top for attaching said document storage file to said hanger bar of said suspension filing unit, said suspension filing unit also has a member extending parallel to and spaced from said hanger bar, and said storage file includes means on said top for interlocking with said member so as to prevent rotation of said document storage file about said hanger bar.

12. A storage file system according to claim 11 further including a lock means on said top movable into embracing relation with said hanger bar so as to prevent inadvertent disengagement of said hook means from said hanger bar.

13. A storage file system according to claim 11 wherein said interlocking means is a tab having a portion extending in spaced-parallel relation to the top, defining therebetween a space open toward the back of the storage file, and wherein the member is strap-like and is at least partially receivable within said space.

* * * * *